United States Patent Office 2,938,905
Patented May 31, 1960

2,938,905

NEW NITRO DYESTUFFS

Frank Hayhurst Slinger, Manchester, England, assignor to Imperial Chemical Industries Limited, London, England, a corporation of Great Britain No Drawing. Filed Dec. 9, 1957, Ser. No. 701,364

Claims priority, application Great Britain Dec. 14, 1956

9 Claims. (Cl. 260—279)

This invention relates to new nitro dyestuffs, and more particularly it relates to new nitro dyestuffs containing sulphonamide groups, valuable for the production of fast colourations on textile materials.

According to the invention there are provided, as new nitro dyestuffs, the compounds of the formula:

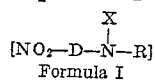

Formula I wherein D stands for a benzene or naphthalene nucleus which may be further substituted, N stands for a nitrogen atom in ortho position to the nitro group, X stands for a hydrogen atom or for an alkyl or substituted alkyl group, R stands for a non-acyl organic radical attached to the nitrogen atom N through a carbon atom, which radical may be joined with X or to D in the other position ortho to the nitrogen atom N to form with the nitrogen atom N a heterocyclic radical, characterised in that the compounds contain a beta-halogenoalkyl sulphamyl group.

In the above formula, R may represent any acyclic radical such as alkyl or alkenyl, or any cyclic radical, provided that R is not an acid radical such as acetyl, benzoyl or s-triazinyl. As examples of alkyl groups represented by R and by X in the above formula there may be mentioned methyl, ethyl, iso-propyl, t-butyl, hexyl, iso-octyl and dodecyl. As an example of alkenyl groups represented by R there may be mentioned allyl.

As examples of substituents which may be present in the alkyl groups represented by X, there may be mentioned cyano, hydroxy and alkoxy such as methoxy, ethoxy and beta-ethoxyethoxy.

As examples of unsubstituted cyclic radicals represented by R, there may be mentioned for example aryl radicals such as phenyl and alpha- and beta-naphthyl, cycloalkyl radicals such as cyclopentyl and cyclohexyl, and heterocyclic radicals such as 2-benzthiazolyl and 2-benzoxazolyl.

Where, in the new dyestuffs, R is connected to X or to D to form a heterocyclic radical, the radical R may be such that the heterocyclic radical formed may contain more than one heteroatom in the ring for example it may contain one or more nitrogen, sulphur and/or oxygen atoms in the ring in addition to the nitrogen atom N. As examples of unsubstituted heterocyclic radicals which may thus be formed by attachment of R to X, there may be mentioned morpholinyl and piperazinyl. As examples of unsubstituted heterocyclic radicals formed by attachment of R to D there may be mentioned phenoxazinyl, phenothiazinyl and acridonyl.

However, compounds of the invention are not limited to those where R represents unsubstituted cyclic radicals as mentioned above, and the nucleus represented by D and the radicals represented by, or formed in part by, R may contain further substituents.

As examples of further substituents which may be present, there may be mentioned groups of the kind —Y—B and —Y₁—B₁—Y—B where Y and Y₁ may be the same or different and stand for a direct link or for a divalent linking group of the type —NQ—, —SO₂—, —S—, —O—, SO₂.NQ—, —CO.NQ—, —NQ.SO₂—, —NQCO—, —CO—, —CH₂— or —CH=CH— (wherein Q stands for a hydrogen atom or for a hydrocarbon radical which may be substituted) and B and B₁ stand for mono- and divalent, aryl, cycloalkyl or heterocyclic radicals respectively.

There may also be present as further substituents, in the nucleus represented by D, and in the radicals represented by R, B and B₁, halogen atoms such as chlorine and bromine and groups such as alkyl, for example methyl, sulphonic acid, carboxylic acid, carbamyl and mono- and di-substituted carbamyl, cyano ester, sulphamyl and mono- and di-substituted sulphamyl, ketonic, trifluoromethyl, sulphinic esters, nitro, sulphone, hydroxyl, ether, amino, mono- and di-substituted amino, acylamido and sulphamido groups.

According to a further feature of the invention there is provided a process for the manufacture of the new nitro dyestuffs which comprises interacting a beta-halogeno-alkylamine and a compound of the formula:

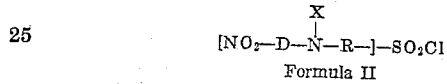

Formula II wherein D, X and R have the meanings stated above.

As examples of beta-halogenoalkylamines which may be used in the above process there may be mentioned beta-chloroethylamine, beta-bromoethylamine, beta-bromo-n-butylamine, beta-chloroisopropylamine and beta-chloroisobutylamine.

As examples of compounds of Formula II which may be used in the above process, there may be mentioned 2 - nitrodiphenylamine - 4 - sulphonyl chloride, 2 - nitroacridone-sulphonyl chloride and 2-nitrophenylcyclohexylamine-4-sulphonyl chloride.

In carrying out the above process the interaction may conveniently be brought about by stirring the reactants together in a suitable liquid reaction medium, which may be inorganic for example water or organic for example alcohol, but there is preferably used a mixture of water with a water-miscible organic liquid as reaction medium, since thereby it is usually possible to obtain a medium in which the reaction proceeds quickly and yet in which the product is insoluble and may be isolated by filtration, washing and drying. It is usually advantageous to add an acid-binding agent, for example sodium bicarbonate or sodium acetate to the reaction medium.

The interaction may usually be carried out at a temperature below 30° C.

As a further feature of the invention, there is provided a modified process for those compounds of the invention wherein, in Formula I the radical R is not joined to the nucleus D, which comprises heating together o-chloronitrobenzene, o-chloronitronaphthalene or a derivative thereof and an amine of the formula X—NH—R wherein X and R have the meanings given above, wherein one of the reactants contains a sulphon-β-halogenoalkylamide group.

Suitable o-chloronitro compounds for use in the modified process include, for example 2-chloronitrobenzene-5-sulphon-β - chloroethylamide, 2 - chloronitrobenzene-5-sulphon-β-bromoethylamide and 4-chloro-5-nitro-2-methylbenzene-sulphon-β-chloroethylamide.

Suitable amines for use in the modified process include, for example 2-methoxy-5-aminobenzene-sulphonic acid, 4-amino-4′-acetylaminodiphenylamine-2-sulphonic acid, aniline, o-, m- and p-toluidines, o-, m- and p-anisidines, o-, m- and p-chloroanilines, metanilic acid, m-aminobenzoic acid, 2-naphthylamine, m-nitroaniline, 2-nitro-4-aminotoluene, 4 - aminodiphenylamine, 1-naphthylamine-6-sulphonic acid, 4-acetylaminoaniline, 2-aminobenzothiazole, 2-aminobenzoxazole, 1-phenyl-3-amino-5-pyrazolone, 2-(4'-aminophenyl)-6-methylbenzthiazole, 3-aminopyridine and cyclohexylamine.

The modified process may be carried out by heating the reactants in a solvent in presence of an acid-binding agent. The preferred solvent is alcohol or aqueous alcohol, and acid binders are preferred which are insoluble in the medium, such as calcium carbonate or magnesium oxide.

After completion of the reaction, the products may be isolated, if soluble in the cooled reaction medium, by addition of a substance which modifies the medium so that it no longer acts as solvent for the product; for example salt may be added to an aqueous medium and water may be added to an alcohol medium.

As a further feature of the invention there is provided a modified process for the manufacture of new nitro dyestuffs which comprises treating a compound of Formula I wherein D, X and R have the meanings given above and which contains a beta-hydroxyalkylsulphamyl group but no other alcoholic hydroxyl group with a halogenating agent such as thionyl chloride or phosphorus tribromide. Particularly useful for this purpose is methane sulphonyl chloride, which behaves as a halogenating agent for alcoholic hydroxyl groups when the reaction is carried out at elevated temperatures for example between 50° C. and 100° C. in an organic basic medium such as pyridine. The product may be isolated by drowning the reaction mixture into water or dilute aqueous mineral acid. Suitable (beta-hydroxyethyl)sulphamyl compounds for use in this process include, for example, 2-nitro-4-(beta-hydroxyethyl)sulphamyl - diphenylamine, 2-nitro-4-(beta-hydroxyethyl)sulphamyl-N - cyclohexylaniline and 4'-methoxy-3'-sulpho-2-nitro-4-(beta-hydroxyethyl)sulphamyl-diphenylamine.

The new nitro dyestuffs are "reactive" dyestuffs for protein, cellulosic and, in particular, polyamide textile materials, that is to say, when used for the colouration of these materials under suitable conditions, the new nitro dyestuffs form a chemical link with the molecules forming the fibre.

This belief is based on the observation that a part, only, of the dyestuff in dyed textile material may be extracted with organic solvents such as propanol, and the percentage of the dyestuff in the dyed material which has reacted may be determined by comparison of the amount of dyestuff which can be extracted by solvent from the dyed textile material with the amount of dyestuff which cannot so be extracted. It has been ascertained that, in nylon dyed with the water-insoluble dyestuffs of the invention, in general, at least 60% of the dyestuff on the fibre has reacted with the fibre.

The dyestuffs of this invention which contain sulphonic acid groups are especially suitable for application to cellulosic textile materials, for example cotton, linen and viscose rayon, by dyeing processes which comprise applying the dyestuff in aqueous solution to the textile materials in conjunction with a treatment with an acid-binding agent, for example caustic soda or sodium carbonate, the treatment with the acid-binding agent being carried out prior to, simultaneously with or subsequent to the treatment with the dyestuff solution.

They may also be used for the printing of cellulosic textile materials by a process which comprises applying thereto a printing paste containing the dyestuff and a substance which on heating or steaming liberates an acid-binding agent, for example sodium bicarbonate, and subsequently subjecting the textile material to the action of heat or steam. They may also be used for the printing of wool and silk and regenerated protein fibres such as casein and ardein. They may also be used for the dyeing of silk and polyamide textile materials for example textile materials containing a polyhexamethylene adipamide or the polymer obtained from caprolactam.

The dyestuffs of this invention which are insoluble or sparingly soluble in water may be used in the form of a finely-divided aqueous dispersion for the dyeing and printing of wool, silk and textile materials containing artificial fibres, for example fibres made from polyamides such as polyhexamethylene adipamide and the polymer obtained from caprolactam, from cellulose esters for example cellulose acetate and cellulose triacetate, from polyurethanes and from linear aromatic polyesters for example polyethylene terephthalate.

By the above processes there are obtained yellow, orange and red-brown colourations having high light-fastness and fastness to wet treatments.

The invention is illustrated but not limited by the following examples in which parts and percentages are by weight:

*Example 1*

37 parts of beta-chloroethylamine hydrochloride are dissolved in 200 parts of water and 27 parts of sodium bicarbonate are added. The solution is cooled and stirred at a temperature between 10° C. and 15° C. and a solution of 25 parts of 2-nitrodiphenylamine-4-sulphonyl chloride in 25 parts of acetone is added. The mixture is stirred for one hour, then the yellow precipitate of 2-nitrodiphenylamine-4-sulphon-beta-chloroethylamide is filtered off, washed well with water and dried at room temperature. The product contains 11% of chlorine. The theoretical chlorine content is 10.0%. From an aqueous dispersion this product dyes nylon in yellow shades which have excellent fastness to wet treatments.

The 2-nitrodiphenylamine-4-sulphonyl chloride used in this example may be obtained by treating the sodium salt of the corresponding sulphonic acid with a mixture of phosphorus pentachloride and phosphorus oxychloride.

*Example 2*

30 parts of 2-nitrochlorobenzene-4-sulphon-beta-chloroethylamide, 50 parts of ethyl alcohol, 2 parts of 2-methoxy-5-aminobenzene sulphonic acid, 50 parts of water and 10 parts of precipitated chalk are stirred at the boiling point of the mixture for 4 hours. The mixture is cooled to room temperature and sodium carbonate is added until the solution is alkaline to Brilliant Yellow indicator. The thick orange solution is filtered from calcium carbonate. On addition of 200 parts of water and 20 parts of sodium chloride to the filtrate the product is precipitated as an oil which solidifies on stirring for a short time. The yellow solid is filtered off, washed on the filter with 20% sodium chloride solution and dried in vacuo. The dry product contains about 10% of sodium chloride. It contains 6.0% of organically bound chlorine. 2-nitro-4' - methoxy - 4-sulphon-beta-chloroethylamidodiphenylamine-3'-sodium sulphonate of 90% purity contains 6.55% organically-bound chlorine. This product can be used for the dyeing and printing of cotton and viscose in yellow shades which are fast to wet treatments.

The 2 - nitrochlorobenzene-4-sulphon-beta-chlorethylamide used in this example may be obtained as follows:

100 parts of o-chloronitrobenzene are dissolved in 328 parts of chlorosulphonic acid and the solution is heated at 130° C. for 3 hours. The solution is cooled and drowned in 2,000 parts of crushed ice and the white precipitate is filtered off and washed with water until it is substantially free from mineral acid. It is then dissolved in 300 parts of benzene. 100 parts of betachloroethylamine hydrochloride are dissolved in 250 parts of water, and the solution is stirred at 30° C., and 260 parts of 15% sodium carbonate solution and the above benzene solution are added slowly and simultaneously during one hour, the rate of addition being such that the aqueous layer is maintained slightly alkaline to Brilliant Yellow indicator. When addition is complete the mixture is stirred for 16 hours and the mixture is then filtered. The product is obtained as a white solid melting at 100° to 102° C.

Example 3

30 parts of beta-bromoethylamine hydrobromide are dissolved in 100 parts of water and 12 parts of sodium bicarbonate are added and the solution is cooled to a temperature between 10 and 15° C. A solution of 16 parts of 2-nitrodiphenylamine-4-sulphonyl chloride in 100 cc. of acetone is added and the mixture is stirred for one hour. The yellow solid is filtered off, washed with water and dried at room temperature. It can be recrystallised if desired from a mixture of glycol monoethyl ether and water. The recrystallised product melts at 144–5° C. and is found on analysis to contain 42.4% of carbon, 3.6% of hydrogen, 10.6% of nitrogen, 7.8% of sulphur and 19.7% of bromine. 2-nitro-4-(beta-bromoethyl)sulphamyl-diphenylamine ($C_{14}H_{14}O_4N_3SBr$) theoretically contains 42.00% of carbon, 3.50% of hydrogen, 10.50% of nitrogen, 8.00% of sulphur and 20.00% of bromine.

The product dyes nylon from an aqueous dispersion in yellow shades which have excellent fastness to wet treatments.

Example 4

18 parts of 4-chloro-3-nitrobenzene-sulphon-beta-chloroethylamide, 7 parts of aniline, 7.5 parts of calcium carbonate and 90 parts of ethyl alcohol are stirred together boiled under a reflux condenser for 24 hours. The yellow solution is filtered while still hot to remove calcium salts and the filtrate on cooling deposits yellow crystals which are filtered off and can be recrystallised if desired from glycol monoethyl ether. The recrystallised product melts at from 146 to 147° C. and is a purer form of the product of Example 1. Prepared in this way the product is found on analysis to contain 47.1% of carbon, 3.8% of hydrogen, 11.5% of nitrogen, 8.6% of sulphur and 9.7% of chlorine. 2-nitro-4-(beta-chlorethyl)sulphamyl diphenylamine ($C_{14}H_{14}O_4N_3SCl$) theoretically contains 47.3% of carbon, 3.44% of hydrogen, 11.8% of nitrogen, 9.0% of sulphur and 10.0% of chlorine.

The 4-chloro-3-nitrobenzene-sulphon-beta-chloroethylamide used as starting material in this example can be obtained by condensation of 4-chloro-3-nitrobenzene-sulphonyl chloride with beta-chloroethylamine hydrochloride in presence of sodium carbonate. The pure compound has a melting point of 103° C.

Example 5

6.7 parts of 4-chloro-3 nitrobenzene-sulphon-beta-chloroethylamide, 3.43 parts of p-phenetidine, 2.5 parts of calcium carbonate and 50 parts of ethyl alcohol are stirred and boiled under a reflux condenser for 24 hours. The yellow solution is filtered, whilst still hot, from insoluble calcium salts and the filtrate on cooling deposits yellow crystals of 4'-ethoxy-2-nitro diphenylamine-4-sulphon-beta-chloroethylamide. After recrystallisation from a mixture of glycol mono ethyl ether and water the product melts at from 147 to 148° C. On analysis it is found to contain 48.4% of carbon, 4.3% of hydrogen and 9.0% of chlorine. $C_{16}H_{18}O_5N_3SCl$ theoretically contains 48.1% of carbon, 4.5% of hydrogen and 8.9% of chlorine.

In place of p-phenetidine used in this example there may be used the equivalent amount of the amines given in the following table, which also gives the melting points and analysed figures of the products so obtained.

| Amine | M.P., °C. | Found (Percent) | | | Required (Percent) | | |
|---|---|---|---|---|---|---|---|
| | | C | H | Cl | C | H | Cl |
| p-toluidine | 154 to 5 | 48.7 | 4.3 | 9.9 | 48.7 | 4.33 | 9.61 |
| beta-naphthylamine | 164 to 6 | 53.2 | 4.0 | 9.4 | 53.0 | 4.42 | 8.71 |
| p-aminoacetanilide | 175 to 6 | 46.2 | 4.3 | 8.9 | 46.55 | 4.12 | 8.61 |
| m-aminobenzotrifluoride | 124 to 6 | 42.0 | 3.0 | 9.7 | 42.50 | 3.07 | 9.98 |

All these products dye nylon from an aqueous dispersion in yellow shades which have excellent fastness to wet treatments.

Example 6

10 parts of 1-nitroacridone are dissolved in 60 parts of chlorosulphonic acid and the solution is heated to 100° C. for 2 hours. The solution is cooled, poured into crushed ice and the precipitate is filtered off and washed well with water. The mixture of nitroacridone-monosulphonyl chlorides obtained in this way is suspended in 200 parts of acetone and the suspension is neutralised to Congo red by addition of 2 N sodium carbonate solution. A solution of 15 parts of beta-chloroethylamine hydrochloride in 65 parts of water is neutralised by addition of 40 parts of 2 N sodium carbonate solution and is then added to the acetone suspension. The mixture is stirred for 16 hours, during which time 40 parts of 2 N sodium carbonate solution are slowly added so as to keep the mixture slightly alkaline. The yellow solid is then filtered off, washed well with water and recrystallised from glycol mono ethyl ether. The product so obtained contains 47.4% of carbon, 3.3% of hydrogen, 11.0% of nitrogen, 9.8% of chlorine and 8.2% of sulphur. 1-nitro-x-(beta-chloroethyl)sulphamyl acridone ($C_{15}H_{12}O_5N_3SCl$) theoretically contains 47.2% of carbon, 3.14% of hydrogen, 11.0% of nitrogen, 9.3% of chlorine and 8.4% of sulphur.

In place of the beta-chloroethylamine hydrochloride used in this example there may be used the equivalent weight of beta-bromoethylamine hydrobromide. The product so obtained contains 43.1% of carbon, 2.9% of hydrogen, 10.0% of nitrogen, 7.5% of sulphur and 19.6% of bromine. $C_{15}H_{12}O_5N_3SBr$ theoretically contains 42.3% of carbon 2.8% of hydrogen, 9.9% of nitrogen, 7.5% of sulphur and 18.8% of bromine.

Both products dye nylon from aqueous dispersions in yellow shades which have excellent fastness to washing.

Example 7

7.3 parts of 4-beta-hydroxyethylsulphamyl-2-nitro diphenylamine are dissolved in 40 parts of pyridine and to the stirred solution there are added 4.4 parts of methane sulphonyl chloride. An exothermic reaction ensues and when this has subsided, the mixture is heated to a temperature of 95 to 100° C. and stirred for 1 hour. The solution is poured into 300 parts of 2 N hydrochloric acid and the supernatant liquid is decanted. The semi-solid product is dissolved in 100 parts of acetone and 300 parts of water are added. The precipitated product is filtered off and can be crystallised from a mixture of ethylene glycol monoethylether and water. The product so obtained melts at 146 to 147° C. and is identical with the product of Example 4.

The 4 - beta - hydroxyethylsulphamyl-2-nitrodiphenylamine used as starting material may be made from 4-chloro-3-nitrobenzene sulphonyl chloride by successive condensation with ethanoalmine and then with aniline. The pure compound melts at from 101 to 102° C.

Example 8

7.45 parts of 2-nitro-4-beta-hydroxyethylsulphamyl-N-cyclohexylaniline are dissolved in 40 parts of pyridine and 4.4 parts of methane sulphonyl chloride are added. An exothermic reaction ensues and when this has subsided, the mixture is heated to a temperature between 95 and 100° C. and stirred for one hour. The solution is poured into 300 parts of 2 N hydrochloric acid and the supernatant liquid is decanted. The semi-solid product is dissolved in 100 parts of acetone and precipitated in a solid form by addition of 300 parts of water. The precipitated product is filtered off and can be crystallised from methyl alcohol. It forms yellow needle shaped crystals melting at 133° C. and contains 9.6% of chlorine. 2-nitro-4-beta-chloroethyl sulphamyl-N-cyclohexylaniline theoretically contains 9.8% of chlorine.

From an aqueous dispersion this product dyes nylon in greenish-yellow shades which have excellent fastness to washing.

Example 9

16.05 parts of 4-amino-4'-acetylaminodiphenylamine-2-sulphonic acid, 13.35 parts of 4-chloro-3-nitrobenzene-sulphon-beta-chloroethylamide, 10 parts of calcium carbonate, 50 parts of ethyl alcohol and 50 parts of water are stirred and boiled under a reflux condenser for 16 hours. The mixture is cooled and sodium carbonate is added until the solution is alkaline to Brilliant Yellow indicator. 500 parts of water are added to dissolve the brown product and the solution is filtered and 100 parts of sodium chloride are dissolved in the filtrate. The brown solid which is precipitated is filtered off, washed on the filter with 20% sodium chloride solution and dried in vacuo. The dried product contains about 25% of sodium chloride. It contains 3.9% of organically bound chlorine. 2-nitro-4'-(4''-acetylaminoaniline)-4-beta-chloroethylsulphamyl diphenylamine-3-sodium sulphonate of 75% purity contains 4.33% of organically bound chlorine. This product can be used for the dyeing and printing of cotton and viscose in brown shades which are fast to wet treatments.

Example 10

6.74 parts of 4-beta-hydroxyethylsulphamyl-2-nitro diphenylamine and 28.5 parts of phosphorus tribromide are stirred and heated to 60° C. when hydrogen bromide is evolved. After one hour the mixture is poured into 300 parts of water and the yellow product is filtered off. It can be purified by passage of an ethanolic solution through a column of alumina. The yellow solution which passes through the column is concentrated by evaporation and in this way yellow crystals are obtained identical with the product of Example 3.

Example 11

6.3 parts of 4-chloro-3-nitrobenzene sulphon(1'-chloro-2'-butyl)amide, 1.9 parts of aniline, 3.0 parts of calcium carbonate and 50 parts of ethyl alcohol are stirred together and boiled under a reflux condenser for 17 hours. The yellow solution is filtered while still hot to remove calcium salts and the filtrate on cooling deposits yellow crystals which are filtered off and can be recrystallised if desired from ethyl alcohol. The recrystallised product melts at 121 to 123° C.

The 4-chloro-3-nitrobenzene sulphon(1'-chloro-2'-butyl) amide used as starting material in this example can be obtained by condensation of 4-chloro-3-nitrobenzene sulphonyl chloride with 2-amino-1-butyl chloride (obtained by the action of thionyl chloride on 2-amino-1-butanol hydrochloride). It melts at from 105 to 106° C.

Example 12

5.7 parts of 2-nitro-4-beta-hydroxyethylsulphamyl-N:N-diethylaniline are dissolved in 40 parts of pyridine and to the stirred solution there are added 4.4 parts of methane sulphonyl chloride. An exothermic reaction ensues and when this has subsided the mixture is heated to a temperature of 55 to 60° C. and stirred for 1 hour. The solution is poured into 300 parts of cold water and the liquid is decanted. The semi-solid product is washed with water by decantation and is dried in a vacuum desiccator. Crystallisation from benzene gives a product melting at 130 to 131° C.

The 2-nitro-4-beta-hydroxyethylsulphamyl-N=N-diethylaniline used as starting material in this example can be obtained by reaction of 4-chloro-3-nitrobenzene sulphon(beta-hydroxyethyl)amide with diethylamine in presence of sodium bicarbonate at room temperature. The pure product melts at from 127 to 128° C.

What I claim is:

1. Nitrodyestuffs of the formula:

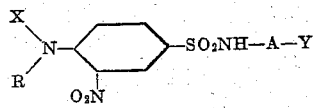

wherein:

A is an alkylene radical having from 2 to 4 carbon atoms,
Y is selected from the class consisting of chlorine and bromine and is attached to the β-carbon atom of the said alkylene radical,
X is selected from the class consisting of hydrogen, alkyl groups containing up to 12 carbon atoms, hydroxyethyl, and β-ethoxyethyl,
R is selected from the class consisting of
(1) lower alkyl, cyclohexyl, phenyl and naphthyl;
(2) substituted phenyl and naphthyl rings wherein the substituents are selected from the group consisting of methoxy, ethoxy, sulfo, trifluoromethyl, acetylamino, phenylamino, methyl, nitro, chlorine, and bromine; and
(3) phenylene radical linked through a carbonyl group to the benzene ring in the free ortho position to the

group.

2. 2-nitrodiphenylamine-4-sulfon-beta-chloroethyl-amide.
3. 2-nitro-4'-methoxy-4-sulfon-beta-chloroethylamidodiphenylamine-3-sodium sulfonate.
4. 2-nitro-4-(beta-bromoethyl)sulfamyl-diphenylamine.
5. 2-nitro-4-(beta-chloroethyl)sulfamyl-diphenylamine.
6. 4'-ethoxy-2-nitro diphenylamine-4-sulfon-beta-chloroethylamide.
7. 1-nitro-α-(beta-chloroethyl)sulfamyl acridone.
8. 2-nitro-4-beta-chloroethyl sulfamyl-N-cyclohexylaniline.
9. 2-nitro-4'-(4''-acetylaminoaniline)-4-beta-chloroethylsulfamyl diphenylamine-3-sodium sulfonate.

References Cited in the file of this patent

UNITED STATES PATENTS

| | | |
|---|---|---|
| 2,414,403 | Winterbottom | Jan. 14, 1947 |
| 2,422,029 | McNally et al. | June 10, 1947 |
| 2,466,010 | Dickey et al. | Apr. 5, 1949 |
| 2,506,224 | Kopp et al. | May 2, 1950 |
| 2,725,390 | Fogelman et al. | Nov. 29, 1955 |

OTHER REFERENCES

Crossley et al.: J. Amer. Chem. Soc., vol. 62 (1940), p. 533.